(12) United States Patent
Thomas-Brigden et al.

(10) Patent No.: US 10,866,646 B2
(45) Date of Patent: Dec. 15, 2020

(54) INTERACTIVE MEDIA SYSTEM AND METHOD

(71) Applicant: TILTSTA PTY LTD, Brisbane (AU)

(72) Inventors: Benjamin Thomas-Brigden, Brisbane (AU); Bjoern Morlak, Brisbane (AU)

(73) Assignee: TILTSTA PTY LTD, Brisbane (AU)

( * ) Notice: Subject to any disclaimer, the term of this patent is extended or adjusted under 35 U.S.C. 154(b) by 0 days.

(21) Appl. No.: 15/568,420

(22) PCT Filed: Apr. 20, 2016

(86) PCT No.: PCT/AU2016/050285
§ 371 (c)(1),
(2) Date: Oct. 20, 2017

(87) PCT Pub. No.: WO2016/168893
PCT Pub. Date: Oct. 27, 2016

(65) Prior Publication Data
US 2018/0101238 A1    Apr. 12, 2018

(30) Foreign Application Priority Data

Apr. 20, 2015 (AU) ................................ 2015901421
Oct. 13, 2015 (AU) ................................ 2015904160

(51) Int. Cl.
*G06F 3/01* (2006.01)
*G06F 3/0346* (2013.01)
(Continued)

(52) U.S. Cl.
CPC ............ *G06F 3/017* (2013.01); *G06F 3/0346* (2013.01); *G06Q 30/0241* (2013.01);
(Continued)

(58) Field of Classification Search
CPC ........ G06F 3/017; G06F 3/0346; H04W 4/12; H04N 21/47217; H04N 21/6587;
(Continued)

(56) References Cited

U.S. PATENT DOCUMENTS 6,496,981 B1    12/2002   Wistendahl et al.
6,912,726 B1    6/2005    Chen et al.
(Continued)

FOREIGN PATENT DOCUMENTS

| | | |
|---|---|---|
| CA | 2917174 A1 | 1/2015 |
| JP | 2007207228 A | 8/2007 |
| WO | 2014183098 A2 | 11/2014 |

OTHER PUBLICATIONS

International Search Report and Written Opinion for PCT Patent Application PCT/AU2016/050285, dated Jul. 14, 2016, 10 pages.
(Continued)

*Primary Examiner* — Abhishek Sarma
(74) *Attorney, Agent, or Firm* — Dentons US LLP

(57) ABSTRACT

Interactive computing systems and methods are provided which enable simple and effective interaction with a user device, which increases interest and improves user experience. The interactive system comprises a user device including a motion sensor, for receiving motion-based gestures through motion of the user device; and a controller, coupled to the motion sensor, configured to control one or more aspects of the system according to the motion-based gestures. Advantageously, the system enables single handed operation of the user device.

18 Claims, 9 Drawing Sheets

(51) Int. Cl.
*H04N 21/6587* (2011.01)
*H04N 21/472* (2011.01)
*H04N 21/637* (2011.01)
*H04N 21/60* (2011.01)
*H04N 21/482* (2011.01)
*G06Q 30/02* (2012.01)
*H04W 4/12* (2009.01)

(52) U.S. Cl.
CPC ..... *H04N 21/47217* (2013.01); *H04N 21/482* (2013.01); *H04N 21/60* (2013.01); *H04N 21/637* (2013.01); *H04N 21/6587* (2013.01); *H04W 4/12* (2013.01)

(58) Field of Classification Search
CPC .... H04N 21/482; H04N 21/637; H04N 21/60; G06Q 30/0241
See application file for complete search history.

(56) References Cited

U.S. PATENT DOCUMENTS

| | | | |
|---|---|---|---|
| 7,559,017 | B2 | 7/2009 | Datar et al. |
| 8,112,702 | B2 | 2/2012 | Badoiu et al. |
| 8,151,182 | B2 | 4/2012 | Datar et al. |
| 8,209,223 | B2 | 6/2012 | Fink et al. |
| 8,423,076 | B2 | 4/2013 | Kim et al. |
| 8,458,053 | B1 | 6/2013 | Buron et al. |
| 8,560,405 | B1 | 10/2013 | Buron et al. |
| 8,565,791 | B1 | 10/2013 | Schilit et al. |
| 8,638,190 | B1 | 1/2014 | Want et al. |
| 8,732,766 | B2 | 5/2014 | Fink et al. |
| 8,775,922 | B2 | 7/2014 | Datar et al. |
| 8,776,132 | B2 | 7/2014 | Low et al. |
| 8,837,819 | B1 | 9/2014 | Lees et al. |
| 8,863,175 | B2 | 10/2014 | Waibel et al. |
| 8,914,365 | B2 | 12/2014 | Lenahan et al. |
| 8,997,139 | B2 | 3/2015 | Low et al. |
| 9,009,746 | B2 | 4/2015 | Low et al. |
| 9,066,130 | B1 | 6/2015 | Buron et al. |
| 9,071,282 | B1 | 6/2015 | Want et al. |
| 9,094,692 | B2 | 7/2015 | Zises |
| 9,148,685 | B2 | 9/2015 | Waibel et al. |
| 9,240,059 | B2 | 1/2016 | Zises |
| 9,258,626 | B2 | 2/2016 | Jo |
| 9,270,515 | B1 | 2/2016 | Postelnicu et al. |
| 9,294,712 | B2 | 3/2016 | Cai |
| 9,301,015 | B2 | 3/2016 | Lenahan et al. |
| 9,304,648 | B2 | 4/2016 | Liao et al. |
| 9,357,268 | B2 | 5/2016 | Zises |
| 9,390,448 | B2 | 7/2016 | Chien et al. |
| 9,420,213 | B2 | 8/2016 | Shackleton et al. |
| 9,424,471 | B2 | 8/2016 | Hill et al. |
| 9,438,947 | B2 | 9/2016 | Schneiderman et al. |
| 9,507,830 | B2 | 11/2016 | Chang et al. |
| 9,508,080 | B2 | 11/2016 | Hoelz et al. |
| 9,530,059 | B2 | 12/2016 | Zises |
| 9,532,110 | B2 | 12/2016 | Glasgow et al. |
| 9,576,611 | B2 | 2/2017 | Zises |
| 9,584,866 | B2 | 2/2017 | Lenahan et al. |
| 9,596,516 | B1 | 3/2017 | Fink et al. |
| 9,627,004 | B1 | 4/2017 | Varadarajan et al. |
| 9,648,371 | B2 | 5/2017 | Waibel et al. |
| 9,665,972 | B2 | 5/2017 | Block et al. |
| 9,674,576 | B2 | 6/2017 | Hosein et al. |
| 9,684,644 | B2 | 6/2017 | Badoiu et al. |
| 9,690,768 | B2 | 6/2017 | Badoiu et al. |
| 9,779,304 | B2 | 10/2017 | Varadarajan et al. |
| 9,805,012 | B2 | 10/2017 | Datar et al. |
| 2005/0210417 | A1 | 9/2005 | Marvit et al. |
| 2006/0184966 | A1 | 8/2006 | Hunleth et al. |
| 2006/0197753 | A1 | 9/2006 | Hotelling |
| 2007/0072676 | A1 | 3/2007 | Baluja |
| 2007/0176898 | A1 | 8/2007 | Suh |
| 2008/0115161 | A1 | 5/2008 | Kurzion |
| 2009/0106208 | A1 | 4/2009 | Matellanes et al. |
| 2009/0197635 | A1 | 8/2009 | Kim et al. |
| 2009/0319181 | A1 | 12/2009 | Khosravy et al. |
| 2010/0095326 | A1 | 4/2010 | Robertson |
| 2010/0154007 | A1 | 6/2010 | Touboul et al. |
| 2010/0312596 | A1 | 12/2010 | Saffari et al. |
| 2011/0076941 | A1 | 3/2011 | Taveau et al. |
| 2011/0262103 | A1 | 10/2011 | Ramachandran et al. |
| 2012/0167145 | A1 | 6/2012 | Incorvia |
| 2012/0167146 | A1 | 6/2012 | Incorvia |
| 2012/0197764 | A1 | 8/2012 | Nuzzi et al. |
| 2012/0206647 | A1 | 8/2012 | Allsbrook et al. |
| 2013/0265223 | A1* | 10/2013 | Khosravy ............ G01C 21/20 345/156 |
| 2013/0332960 | A1 | 12/2013 | Young et al. |
| 2014/0047483 | A1 | 2/2014 | Fairbanks |
| 2014/0100993 | A1 | 4/2014 | Farmer |
| 2014/0101551 | A1 | 4/2014 | Sherrets |
| 2014/0152531 | A1 | 6/2014 | Murray et al. |
| 2014/0282743 | A1 | 9/2014 | Howard et al. |
| 2014/0310752 | A1 | 10/2014 | Lam et al. |
| 2014/0365341 | A1 | 12/2014 | MacLaurin et al. |
| 2014/0380380 | A1 | 12/2014 | Heller et al. |
| 2015/0058870 | A1 | 2/2015 | Khanna et al. |
| 2015/0143239 | A1 | 5/2015 | Birkbeck et al. |
| 2015/0170245 | A1 | 6/2015 | Scoglio |
| 2015/0208132 | A1 | 7/2015 | Low et al. |
| 2015/0278840 | A1 | 10/2015 | Zhao et al. |
| 2015/0289022 | A1 | 10/2015 | Gross |
| 2016/0180427 | A1 | 6/2016 | Gonzales |
| 2016/0205446 | A1 | 7/2016 | Cai |
| 2016/0321359 | A1 | 11/2016 | Shackleton et al. |
| 2016/0371546 | A1 | 12/2016 | Yadav et al. |
| 2016/0373796 | A1 | 12/2016 | Schneiderman et al. |
| 2017/0017382 | A1 | 1/2017 | Tobin et al. |
| 2017/0091975 | A1 | 3/2017 | Zises |
| 2017/0164057 | A1 | 6/2017 | Lenahan et al. |
| 2017/0236553 | A1 | 8/2017 | Zises |
| 2017/0300570 | A1 | 10/2017 | Chiarandini et al. |
| 2017/0311019 | A1 | 10/2017 | Waibel et al. |

OTHER PUBLICATIONS

European Search Report received for EP Application No. 16782397, dated Oct. 19, 2018, 9 pages.

European Search Report received for European Application No. 16782397.0, dated Apr. 2, 2020, 5 pages.

Japanese Search Report received for Japanese Application No. 2017-555696, dated Jun. 19, 2020, 13 pages.

* cited by examiner

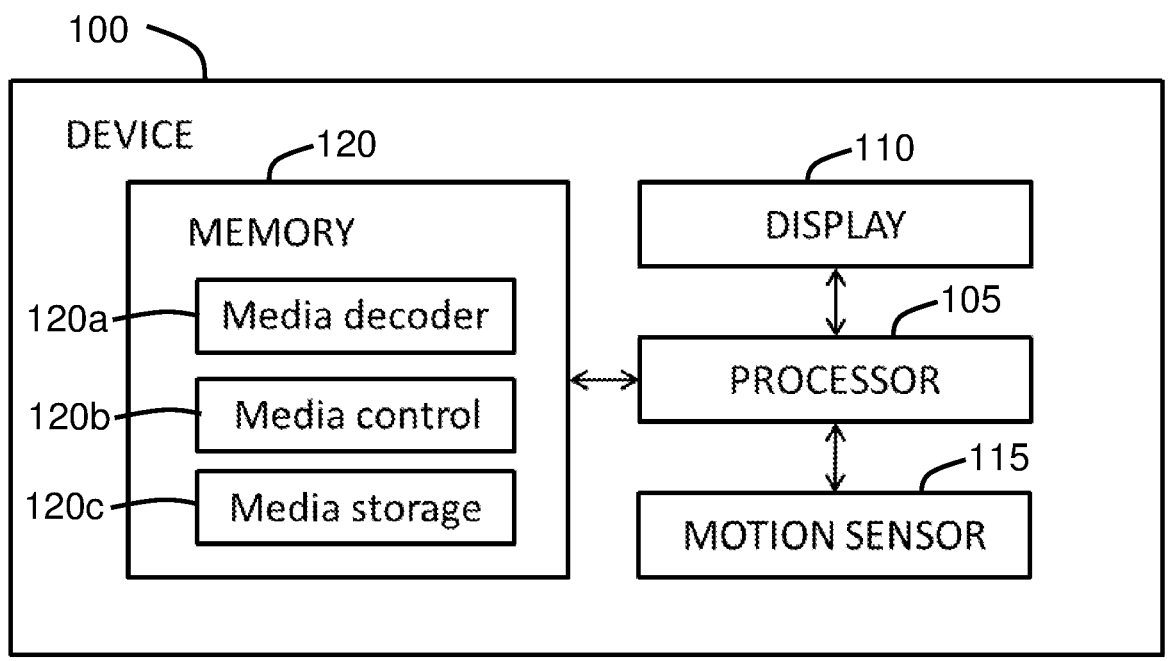
Figure 1
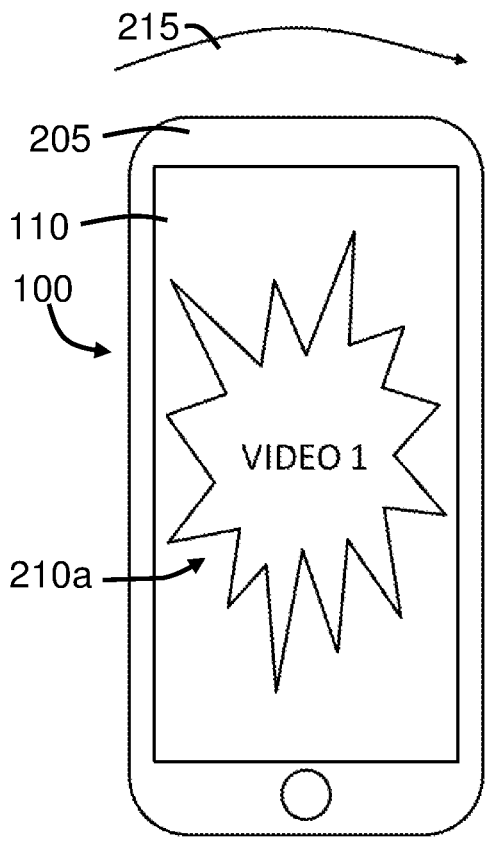 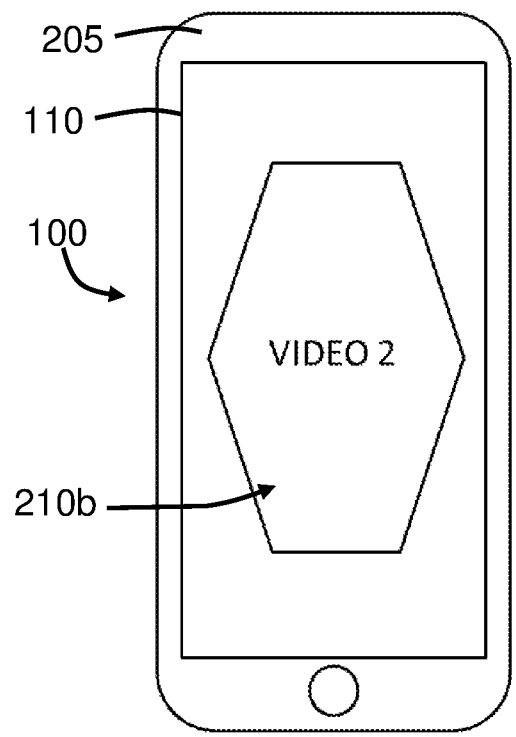
Figure 2a      Figure 2b

INTERACTIVE MEDIA SYSTEM AND METHOD

CROSS-REFERENCE TO RELATED APPLICATION

This application is a U.S. National Stage patent application of PCT/AU2016/050285 filed on Apr. 20, 2016, which claims priority to AU 2015901421, filed Apr. 20, 2015, and AU 2015904160, filed Oct. 13, 2015. The entire contents of which are incorporated herein by reference.

TECHNICAL FIELD

The present invention relates to interactive digital media. In particular, although not exclusively, the invention relates to interactive display of media and playback of video.

BACKGROUND ART

In the past, almost all media content consumed was professionally produced. Radio and television, for example, was professionally produced and broadcast to a large number of users. Now, high quality content creation equipment and software tools are within the reach of reasonably skilled persons, and user generated content (UGC) has become popular. Distribution of such video online via video and social media channels, particularly via mobile devices, is widespread.

A problem with such content is that it is generally not enticing to users, as it is linear, and generally created for a very wide audience. Furthermore, as more and more content is consumed on portable devices, new challenges are being faced, particularly in relation to navigation in such content.

Typically, traditional desktop media interaction methods have been applied to portable devices, which do not provide a good user experience on these portable devices. For example, touch screen devices often incorporate small buttons relating to standard controls, such as pause and play, which, when shown, typically cover a portion of the video, and are generally inconvenient.

A further problem is that advertising on a mobile device is dominated by traditional media, and very limited interactivity with the media is provided. Typically, for a user to respond to a "call to action" in advertising, he or she must navigate to another website (or app) and manually take action there. Such action is clearly inconvenient, and as a result, sales opportunities are often lost.

As such, there is a need for improved interactive media systems and methods.

It will be clearly understood that, if a prior art publication is referred to herein, this reference does not constitute an admission that the publication forms part of the common general knowledge in the art in Australia or in any other country.

SUMMARY OF INVENTION

The present invention is directed to interactive media systems and methods, which may at least partially overcome at least one of the abovementioned disadvantages or provide the consumer with a useful or commercial choice.

With the foregoing in view, the present invention in one form, resides broadly in an interactive computing system comprising:

a user device including a motion sensor, for receiving motion-based gestures through motion of the user device; and a controller, coupled to the motion sensor, configured to control one or more aspects of the system according to the motion-based gestures.

Advantageously, the interactive media system enables simple and effective interaction, which increases interest and improves user experience.

The controller may be configured to selectively control display of media based upon the motion-based gestures and a set of media control instructions. The media control instructions may define a relationship between the motion-based gestures and the control of the display of media. The media control instructions may be defined in a media control file. The media control file may define markers within media files.

The media control file (or the media control instructions) may define a default video, which is configured to be played when no gestures are detected, and other video files, wherein each video file is associated with one motion-based gesture.

Preferably, the controller is configured to control playback of media according to the motion-based gestures.

Preferably, the controller is configured to control the playback of media by selecting media for playback. Selecting media for playback may comprise selecting a media file from a plurality of media files. Alternatively, selecting media for playback may comprise selecting a portion of a media file from a media file. In such case, the portion of the media file may be defined by a time on a timeline of the media file, markers within the media file, or by alternative content of the media file.

The controller may be configured to selectively control playback of media by receiving a first motion-based gesture and determining a first playback configuration in response thereto, and subsequently receiving a second motion-based gesture and determining a second playback configuration in response thereto Control of playback of media may be predefined according to the motion-based gesture. Alternatively, the control of playback of media may be dynamically defined. In such case, the control of playback of media may be dynamically defined according to when the motion based gesture was received, or a state of the system at the time the gesture was received.

Preferably, the media includes visual media. The media may include video. The media may include at least one of audio, text, rich text, stylized text, a Hyper Text Markup Language (HTML) document, an animation, a slide show, a graphic, and an image.

The media may comprise multiple layers of media.

The media may be played back on a display of the user device. Alternatively, the media is played back on a display external to the user device.

The motion-based gestures may comprise a plurality of predefined gestures.

The motion-based gestures may be defined by local motion of the user device. The motion-based gestures comprise one or a combination of: a left tilt, a right tilt, a forward tilt, a rear tilt, an inversion tilt, a circular tilt, a flip tilt, a twist, and a shake of the user device.

The system may further include an accelerometer, wherein the motion-based gestures are determined at least in part according to data from the accelerometer. The system may include a gyroscope, a compass or a positioning system, wherein the motion-based gestures are determined at least in part according to data from the gyroscope, the compass or the positioning system.

The controller may be configured to control presentation of media based upon the motion-based gestures.

The controller may be configured to control an interactive application of the user device. In particular, the controller may be configured to cause the interactive application to purchase an item, add an item to a digital shopping cart or wish list, place a bid on an item, complete a transaction, make a phone call, send an SMS, open an application, communicate with a further device, or call a function of another application.

The system may further include a media player, wherein the controller is configured to control an interactive application of the user device while the media player is playing media.

Control of the interactive application may be independent of the playback of the media.

The controller may form part of the user device

The system may consist of a handheld device.

The system may include a head mounted display.

The controller may be configured to control the one or more aspects of the system according to a set of control instructions and the motion-based gestures, wherein the control instructions define a relationship between the motion-based gestures and the control of the one or more aspects of the system.

In another form, the invention resides broadly in a system for generating interactive media, the system comprising a media control generation component, for generating media control data, wherein the media control data defines a relationship between motion-based gestures defined by motion of a user device and control of media, such that a user is able to selectively control the media based upon the motion-based gestures.

The system may further include a camera, for capturing the media in the form of photos or video.

The system may further include a data interface for receiving the media.

The media control generation component may be configured to generate interactive media based upon motion-based gestures.

In yet another form, the invention resides broadly in an interactive media method comprising:

receiving motion-based gestures through movement of a user device; and controlling presentation of media based upon the motion-based gesture.

In yet another form, the invention resides broadly in an interactive method comprising:

receiving motion-based gestures through movement of a user device; and controlling an interactive application of the user device based upon the motion-based gestures.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 1 illustrates a block diagram of an interactive media display device, according to an embodiment of the present invention;

FIG. 2a illustrates a front view of the interactive media display device in use in a first configuration;

FIG. 2b illustrates a front view of the interactive media display device in use in a second configuration;

Figures 3A, 3B, 3C:
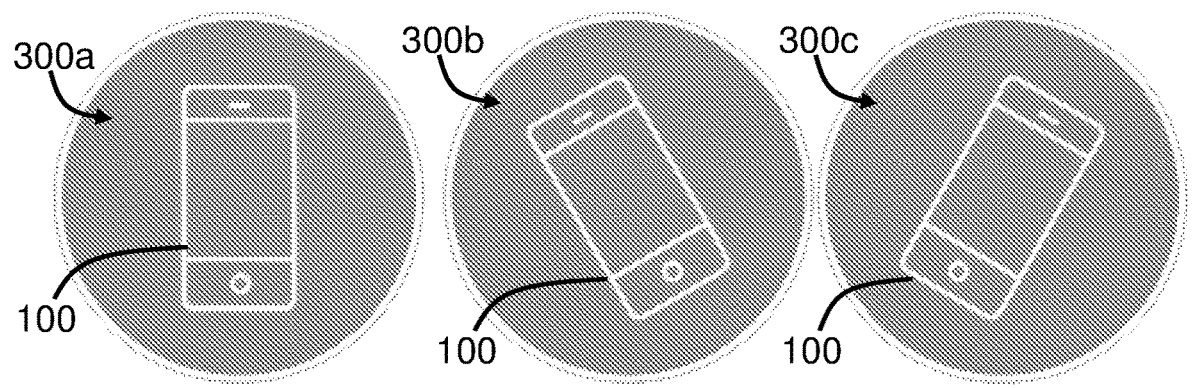
FIGS. 3a-3f illustrates a plurality of predefined movements of the device of FIG. 1.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

FIG. 1 illustrates a block diagram of an interactive media display device 100, according to an embodiment of the present invention. The interactive media display device 100 enables a user to control display of media using motion of the device 100, as discussed in further detail below. Conveniently, the control of media displayed can be performed with one hand, as the same hand that holds the device 100 can be used to tilt, or otherwise provide motion-based input to the device 100.

The interactive media display device 100 includes a processor 105, a display screen 110, coupled to the processor 105, for displaying video to a user, and a motion sensor 115, coupled to the processor 105, for receiving motion information of the device 100.

The motion sensor 115 may comprise an accelerometer and a gyroscope, which are used together to determine motion-based inputs. However, alternatively or additionally, the motion-based inputs may be determined according to a compass, a camera, a positioning sensor (such as a GPS or RF positioning techniques) or any other input that can be used to determine movement of the device 100 such as attitude, rotation rate, acceleration and the like. In a different embodiment, motion based commands are generated by observing changes in user positions as identified by a camera integral to the user device or attached to it.

The interactive media display device 100 includes a memory 120, coupled to the processor 105. The memory 120 includes a media storage component 120c, for storing media for display on the device 100, media decoder instructions 120a, for decoding the stored media, and media control instructions 120b, for controlling display of the stored media using the media decoder instructions 120a.

In use, media of the media storage component 120c is decoded by the media decoder instructions 120a, under the control of the media control instructions 120b, and displayed on the display screen 110. Movement of the device 100 during display is then monitored for and detected by the media control instructions 120b using data from the motion sensor 115. This movement is then used to control display of the media.

The media control instructions 120b may be configured to control display of a single media file by navigating in the media file. In particular, based upon data from the motion sensor 115, the media control instructions 120b may cause the decoder instructions 120a to dynamically navigate between points on a timeline of the media file. As an illustrative example, when the device 100 is tilted to the right (from the perspective of the user), the media control instructions 120b may cause the decoder instructions 120a to jump forward a predefined amount on a timeline of the media file.

Similarly, the media control instructions 120b may cause the decoder instructions 120a to dynamically switch between alternative content of the media file. As an illustrative example, when the device 100 is briefly shaken, the media control instructions 120b may cause the decoder instructions 120a to switch between alternative media of the media file, such as different language tracks of the media file.

Alternatively, the media control instructions 120b may be configured to control playback of multiple media files, by navigating between the media files, based upon movement of the device 100. As an illustrative example, when the device 100 is tilted to the right (from the perspective of the user), the media control instructions 120b may cause the decoder instructions 120a to move to a next media file in a pre-defined sequence of media files.

According to certain embodiments, the device 100 may be configured to navigate between various types of media. For example, the device 100 may be configured to navigate between video and still images through motion-based input. This is particularly advantageous if further information is desired about an item that is shown in a video, and may suit shopping and advertising use cases.

The media files may be stored locally on the device 100 (for example on media storage component 120c), or downloaded or streamed on demand. As such, media may be stored "in the cloud" (i.e. remotely), and updated as desired. This is particularly advantageous where it is desirable to periodically update media files, such as advertising, or when short term promotions are run, without requiring any updates on the device 100.

The device 100 may allow traditional input, e.g. through a touch screen or keyboard, or motion-based input. In some cases, the traditional input and motion based input is mutually exclusive. As such, traditional input may be limited (e.g. a touch screen of the device 100 may be deactivated) when motion-based input is used. This is particularly advantageous where it is likely that a user may accidentally bump the traditional input when entering motion based input.

The interactive media display device 100 may comprise a smartphone, a tablet, or any other suitable portable computing device.

FIG. 2a and FIG. 2b illustrate front views of the interactive media display device 100 in use. As illustrated, the interactive media display device 100 is generally portable and may be specifically designed to be held with one or both hands or be placed in a holding frame for easy viewing, and comprises a substantially planar front face 205 including the display screen 110.

Initially, a first video 210a is displayed on the device 100, as illustrated in FIG. 2a. Partway through the playback of the first video 210a, the user tilts the device to the right (from the perspective of the user), as illustrated by tilt arrow 215, and as described in further detail below.

In response to detection of the tilting of the device 100 (by the motion sensor 115 and media control instructions 120b), a second video 210b is displayed on the device 100, as illustrated with reference to FIG. 2b.

The skilled addressee will readily appreciate that navigation to a third video (not shown), or back to the first video 210a, may be provided through further tilting of the device 100.

FIGS. 3a-3f illustrates a plurality of predefined movements 300a-300f of the device 100. The movements 300a-300f are also referred to as gestures, and enable the user to interact with the device 100, as described above.

FIG. 3a illustrates normal playback mode 300a, where the device 100 is held upright and with only little movement.

FIG. 3b and FIG. 3c illustrate a left tilt 300b and a right tilt 300c of the device 100 respectively. In the case of the left tilt 300b, a top of the device 100 is tilted to the left, from a perspective of the user. In the case of the right tilt 300c, the top of the device 100 is tilted to the right, from the perspective of the user.

Figures 3D, 3E, 3F:
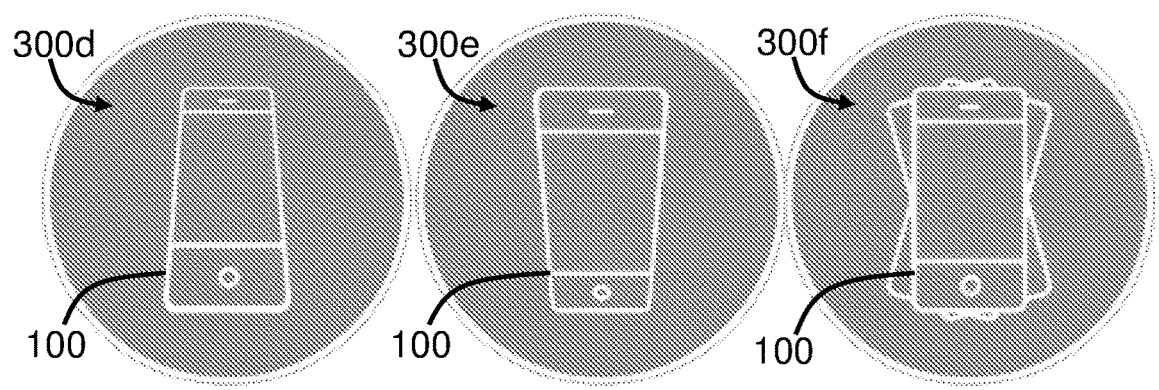

FIG. 3d and FIG. 3e illustrates a forward tilt 300d and a back tilt 300e respectively. In the case of the forward tilt 300d, the top of the device 100 is tilted away from the user's eyes, and in the case of the back tilt 300e, the top of device 100 is tilted towards the user's eyes.

Finally, FIG. 3f illustrates a shake 300f, in which the user shakes the device 100 side to side or up and down or twisting across a vertical or diagonal axis for a short moment.

Other movements may be defined on the device 100, including a double tilt (such as left tilt, followed quickly by another left tilt), a long tilt, a slow tilt, a hard shake, a long shake, a twist, a slap, a fast slap and a movement that results in a sudden stop. Furthermore, the above tilts may be split into a number of sub-tilts, small left tilt (e.g. <30° tilt), a medium left tilt (e.g. >30° and <45° tilt), and a large left tilt (e.g. >45° tilt). Similarly, a movement may be held (e.g. the device may be tilted and held) or not (e.g. after the device is tilted it is returned to its original position).

Furthermore, users may also provide input to the device 100 using non-movement based gestures, such as touch screen gestures including swipe left, right, up or down, pinch or expand, tap, or double tap. This is particularly useful if the user is in an environment where movement of the device 100 as input is not suitable or is not convenient for the user.

According to certain embodiments, the device 100 includes an overview mode, in which icons showing what gestures are available are presented to the user. For example, tapping the screen may cause the device 100 to enter or leave the overview mode. This is particularly advantageous where different gestures are available according to different settings of the video(s) as described in the media control instructions. It also allows for navigation while the device is laying down flat on a surface, such as a table.

According to certain embodiments, the movements or gestures 300a-300f may be defined in absolute terms. For example, the normal playback mode 300a may be defined as substantially upright with reference to the normal pull of gravity. Alternatively, the movements or gestures 300a-300f may be defined in relative terms. For example, the left tilt 300b may be defined by a tilting of the device to the left relative to an earlier position. Relative movements or gestures enable a user to use the device 100 in various positions, for example while lying down, or in any other circumstance where the device is held in a non-upright position during playback.

Figure 4:
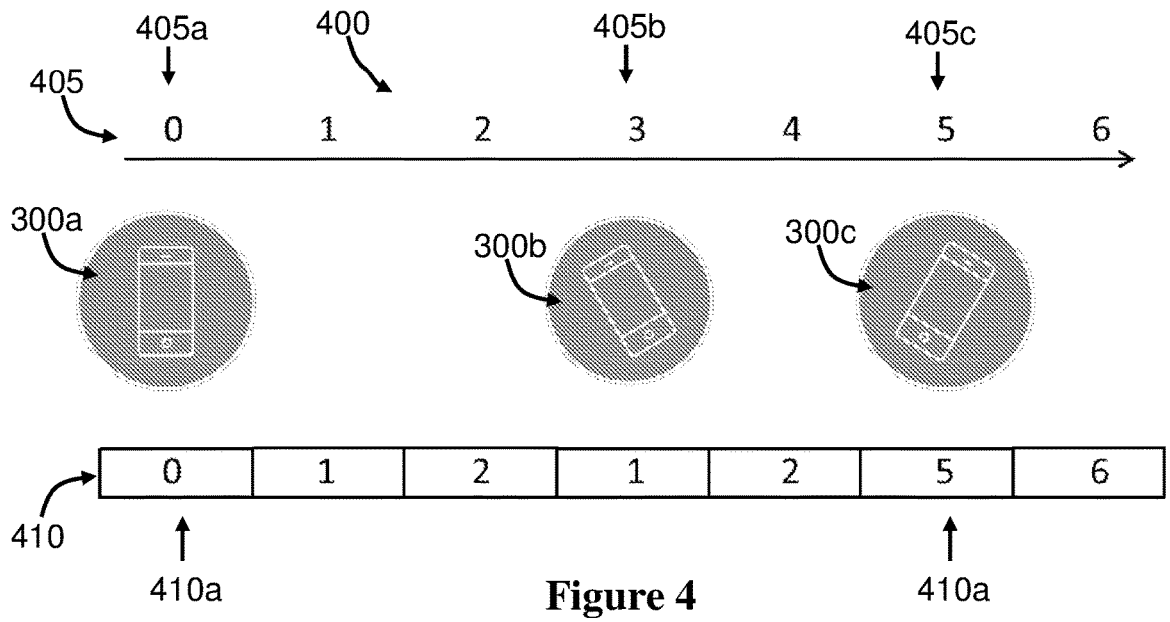
FIG. 4 illustrates a sequence diagram of an interaction between a user and the device of FIG. 1, according to one embodiment of the invention.

FIG. 4 illustrates a sequence diagram 400 of an interaction between a user and the device 100, and a corresponding playback of video 410 on the device, according to a timeline 405. The video 410 comprises a plurality of sequential segments 410a, numbered 1, 2, 3, etc., and by interacting with the device 100, the user is able to navigate between the segments 410a.

Initially, i.e. at time 0 (405a) on the timeline 405, the user holds the device 100 in normal playback mode 300a. As a result, the video 410 plays back normally, i.e. video segments 0, 1, and 2 are played at times 0, 1 and 2 respectively.

At time 3 (405b) on the timeline 405, the user tilts the device 100 into a left tilt 300b. As a result, the device 100 jumps backwards two segments 410a of the video 410, and plays video segments 1 and 2 at times 3 and 4 respectively (rather than video segments 3 and 4 that otherwise would have been shown). The user may choose this feature if he or she was interrupted and wants to view a portion of the video 410 again.

At time 5 (405c) on the timeline 405, the user tilts the device 100 into a right tilt 300b. As a result, the device 100 jumps forwards two segments 410a of the video 410, and plays video segments 5 and 6 at times 5 and 6 respectively (rather than video segments 3 and 4 that otherwise would have been shown).

The segments 410a may be any suitable length, such as 5 or 10 seconds long. Furthermore, the segments 410a need not be of uniform size. For example, each segment 410a may define a scene of a video, wherein the scene is defined by the content of the video. This information is described in the media control instructions.

The video 410 may comprise a legacy video file, such as a file according to the ISO base media file format, the MPEG-4 file format, and may include both audio and video.

Figure 5:
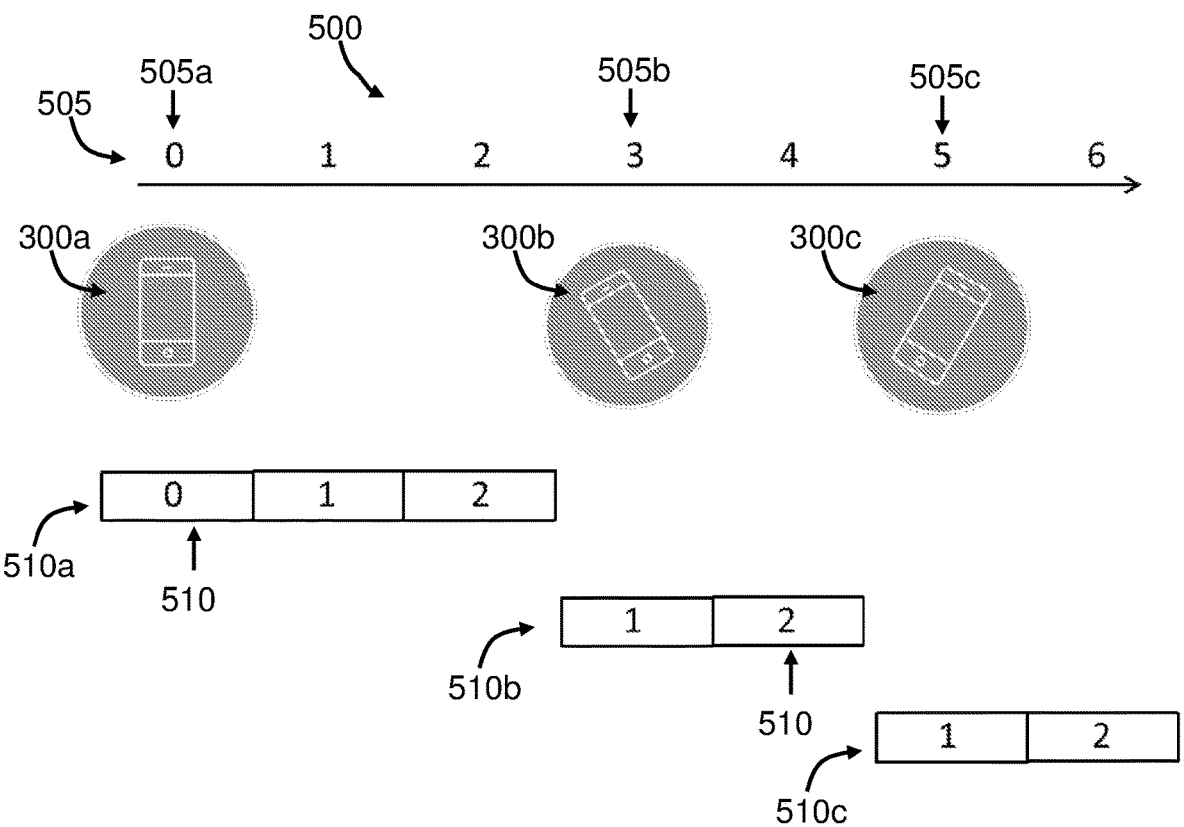
FIG. 5 illustrates a sequence diagram of an interaction between a user and the device of FIG. 1, according to another embodiment of the invention.

FIG. 5 illustrates a sequence diagram 500 of an interaction between a user and the device 100, and a corresponding playback of video files 510a, 510b, 510c on the device 100, according to a timeline 505. The videos 510a, 510b, 510c comprises a plurality of sequential segments 510, similar to the segments 410a of FIG. 4, and by interacting with the device 100, the user is able to navigate between the videos 510a, 510b, 510c Initially, i.e. at time 0 (505a) on the timeline 505, the user holds the device 100 in normal playback mode 300a. As a result, the first video 510a is initially played.

At time 3 (505b) on the timeline 505, the user tilts the device 100 into a left tilt 300b. As a result, the device 100 jumps to the second video 510b, and starts playing the segments 510 from the second video 510b from time 3. The second video 510b is generally associated with the left tilt 300b either implicitly or explicitly.

At time 5 (505c) on the timeline 505, the user tilts the device 100 into a right tilt 300c. As a result, the device 100 jumps to the third video 510c, and starts playing the segments 510 from the third video 510c from time 5. The third video 510c is generally associated with the right tilt 300c either implicitly or explicitly.

The videos 510a, 510b, 510c may be associated with the movements or gestures 300a-300f using a media control file. In such case, the media control file may define which video 510a, 510b, 510c is played upon which interaction, i.e. how the device 100 is to respond to the user's movements and other gestures.

In such case, the media control instructions may be found within a media control file and may comprise a JavaScript Object Notation (JSON) encoded text file. The media control file and the video files 510a, 510b, 510c may be packaged into an archive file and compressed, potentially with a custom file extension to indicate the type of contents of the file. The archive file is not only advantageous in that it is able to compress the files to reduce file size, but also in that it provides a convenient way of distributing the videos 510a, 510b, 510c and the media control file, namely in a single file.

According to certain embodiments, the media control file defines a single default video, also referred to as a "home clip", which the player plays first, plus up to five other clips, wherein one is associated with each of the five gestures, left tilt 300b, right tilt 300c, forward tilt 300d, back tilt 300e, and shake 300f When a gesture is made the player plays the associated clip instantly, then returns to the home clip when finished.

According to alternative embodiments, the media control file may refer to an external location of the video files (e.g. by Uniform resource locator (URL)). As such, the video files need not be transmitted with the media control file, which in turn may reduce bandwidth required to share content.

To exemplify, the syntax for the media control file may be described as follows.

```
{
    "name": "Ice",
    "description": "Ice drift + fire",
    "created": "2015-04-27 19:34:23",
    "modified": "2015-04-28 12:12:56",
    "start": "intro",
    "clips": [
        {
            "id":"intro",
            "filename": "intro.mp4",
            "end": "play",
            "play":"spin-loop"
        },
        {
            "id":"spin-loop",
            "filename": "spin-loop.mp4",
            "end": "loop",
            "gestures": {
                "forward":"spin-go-forward",
                "back":"bye",
                "left":"spin-fix",
                "right":"spin-sitting",
```

```
        "shake":"spin-up-shake"
    }
},
{
    "id":"bye",
    "filename": "bye.mp4",
    "end": "play",
    "play":"spin-loop",
    "mute":true,
    "vibrate":true
},
{
    "id":"spin-fix",
    "filename": "spin-fix.mp4",
    "end": "play",
    "play":"spin-loop"
},
{
    "id":"spin-sitting",
    "filename": "spin-sitting.mp4",
    "end": "play",
    "play":"spin-loop"
},
{
    "id":"spin-up-shake",
    "filename": "spin-up-shake.mp4",
    "end": "play",
    "play":"spin-loop"
},
{
    "id":"spin-go-forward",
    "filename": "spin-go-forward.mp4",
    "end": "play",
    "play":"quad-loop"
},
{
    "id":"quad-loop",
    "filename": "quad-loop.mp4",
    "end": "loop",
    "gestures": {
        "forward":"quad-overtake-forward",
        "back":"quad-rear-back",
        "left":"view-high",
        "right":"view-boom",
        "shake":"moto-loop"
    }
},
{
    "id":"quad-overtake-forward",
    "filename": "quad-overtake-forward.mp4",
    "end": "play",
    "play":"quad-loop",
},
{
    "id":"quad-rear-back",
    "filename": "quad-rear-back.mp4",
    "end": "play",
    "play":"quad-loop"
},
{
    "id":"view-high",
    "filename": "view-high.mp4",
    "end": "play",
    "play":"quad-loop"
},
{
    "id":"view-boom",
    "filename": "view-boom.mp4",
    "end": "play",
    "play":"quad-loop"
},
{
    "id":"moto-loop",
    "filename": "moto-loop.mp4",
    "end": "loop",
    "gestures": {
        "forward":"outro",
        "back":"moto-rear",
        "left":"moto-left",
        "right":"moto-right",
        "shake":"quad-loop"
    }
},
{
    "id":"moto-rear",
    "filename": "moto-rear.mp4",
    "end": "play",
    "play":"moto-loop"
},
{
    "id":"moto-left",
    "filename": "moto-left.mp4",
    "end": "play",
    "play":"moto-loop"
},
{
    "id":"moto-right",
    "filename": "moto-right.mp4",
    "end": "play",
    "play":"moto-loop"
},
{
    "id":"outro",
    "filename": "outro.mp4",
    "end": "finish"
}
]
}
```

In particular, an "id" field may be used to identify each video clip, a "filename" field may be used to associate a filename with the video clip, an "end" field may define what is to happen when an end of the clip is reached, and a "gestures" structure, together with gesture fields such as "forward", "back", "left", "right" and "shake", which define which video clip is to be played upon detection of the corresponding gestures.

In addition to the above fields, the media control file may further include metadata relating to the media, such as where the media was filmed or where it relates to. This could then allow other users to find media close to their location, or search for media relating to a certain location or use map searching features to find the media.

Content may be professionally made for the device 100, or user generated, as outlined below.

Figure 6:
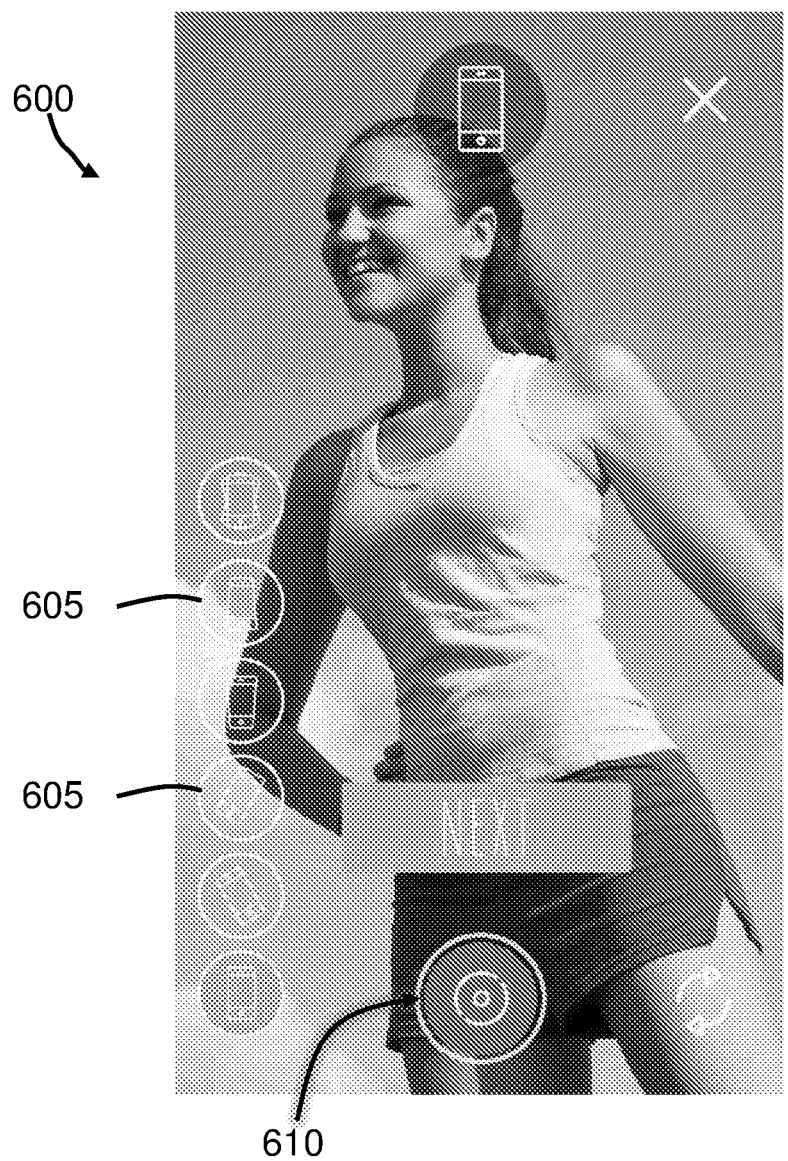
FIG. 6 illustrates a screenshot of a content generation screen of a video generation system, according to an embodiment of the present invention.

FIG. 6 illustrates a screenshot 600 of a content generation screen of a video generation system, according to an embodiment of the present invention. The video recording system may comprise a smartphone, a personal computer or the like.

The content generation screen includes a plurality of gesture buttons 605, which correspond to the gestures, left tilt 300b, right tilt 300c, forward tilt 300d, back tilt 300e, and shake 300f, and static. The gesture buttons enable the user to select the gesture to determine what happens at the decoder on detection of said gesture.

The content generation screen includes a record button 610, which enables the user to capture video in relation to the selected gesture. An alternative button may be provided to enable the user to select a pre-recorded video, from storage local to the system, from a remote system, or from a further device. This is particularly useful if a camera is not available on the system.

In use, the user navigates between the different gesture buttons 605, associates a video with some or each of the associated gestures, and saves the file. The system then automatically generates the media control instructions, and stores it in an archive together with the video clips to simplify the sharing of the generated content.

In other embodiments, an advanced content generation screen may be provided. The advanced content generation screen may enable any number of media clips or files to be linked to motion gestures. As an illustrative example, the advanced content generation screen may define how motion gestures are interpreted for each clip or file. As a result, complex navigation can be provided where, for example, certain video clips can be navigated to only via certain other video clips.

According to certain embodiments, the video generation system includes an accelerometer, gyroscope, compass and/or other motion sensor, which it monitors while recording. Upon detection of a gesture, the system may automatically select the associated gesture button 605, continue to record, and associate the continued recording with the gesture.

According to certain embodiments, the video generation system automatically splices and trims video clips, and/or determines how they relate to other clips, based on how the user was holding the device while recording.

The content generation screen may include the ability for a user to capture an image, and use the captured image to assist in aligning subsequent videos. In such case, the captured image may be overlaid over the captured video, to enable the user to align an item in the scene as captured (e.g. a person) to an item in the captured image (e.g. an image of the person). As a result, the user can ensure that the item being recorded is at approximately the same place at important points of the video, such as start and end points, to provide alignment.

According to certain embodiments, the video generation system enables hands free recording by automatically recording clips one after the other, and automatically associating the recorded clips with gestures. The user may pre-configure the sequence of clips, or use the default configured clip sequence, and an audio or visual indicator may be provided to the user to let the user know when a video recording is about to start or finish and may additionally indicate which gesture they will correspond with.

According to certain embodiments, the media may be manipulated to produce more desirable transitions between media. As an illustrative example, items in the media may be aligned across a transition, visual effects may be added, such as cross-fade effects, fade through black effects, and the like, to various parts of the media, such as at the beginning and the end of a video.

Additionally, the media may be manually manipulated to produce a more desirable effect for when users are later consuming that media and are navigating between the different media. Such functions that may help facilitate the alignment of items between media may include zooming, panning, cropping, etc.

Figure 7:
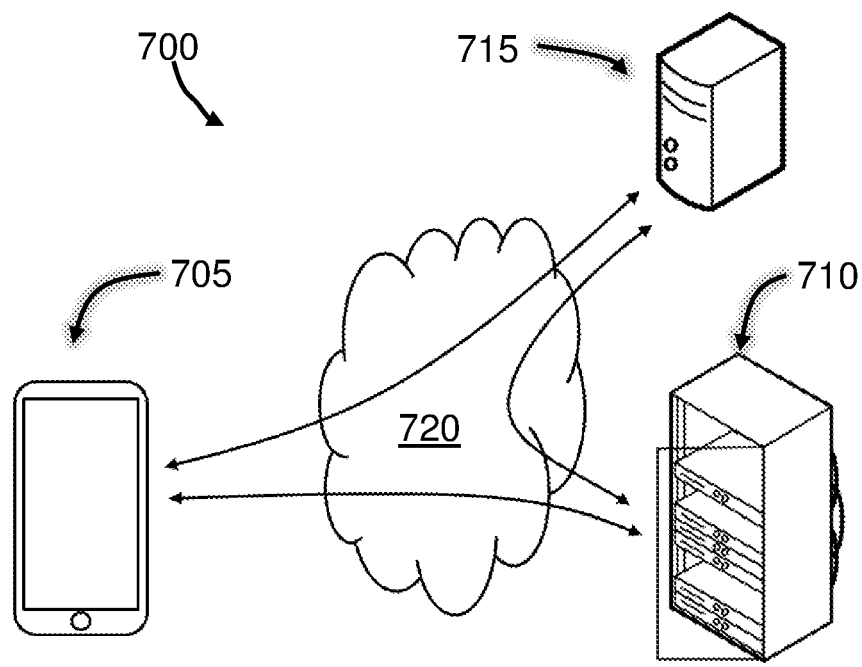
FIG. 7 illustrates a block diagram of an interactive media display system, according to an embodiment of the present invention.

FIG. 7 illustrates a block diagram of an interactive media display system 700, according to an embodiment of the present invention. The interactive media display system 700 is similar to the interactive media display device 100 of FIG. 1.

The interactive media display system 700 includes a portable computing device 705, in the form of a smartphone, a media streaming server 710, and a media control server 715.

In use, video data is streamed from the media streaming server 710 to the portable computing device 705 by a data network 720, such as the Internet. As the portable computing device 705 is moved, motion of the device 705 is detecting using, for example, an accelerometer and gyroscope, and data relating to the motion provided to the media control server 715.

The media control server 715, upon detection of a valid motion gesture, as described above, will instruct the media streaming server 710 to either change the video file, or move to a different part of the video file. New video data is then streamed from the media streaming server 710 to the portable computing device 705.

Alternatively, the media control server 715 may provide control instructions to the portable computing device 705, which is then used by the portable computing device 705 to instruct the media streaming server 710. In such case, the media control server 715 may, for example, comprise a Hypertext Transfer Protocol (HTTP) server. Additionally, the streaming server may provide live content.

Advantageously, only the relevant data is streamed to the portable computing device, which decreases bandwidth usage. This is particularly useful when there are a large number of possible interactions, each with an associated video, as only the videos to be played back need to be provided to the user.

According to certain embodiments (not illustrated), a media player incorporating motion based video control, is provided in a web browser of a user device. Advantageously, the media player is configured to use motion data, if available, and provide alternative navigation elements (e.g. buttons, or voice commands corresponding to the gestures) if not available.

For example, non-motion based data input, such as keyboard or mouse input, may be translated into motion gestures to enable playback of media according to the present invention. In such case, a left arrow key may be translated into a left tilt, a right arrow key may be translated into a right arrow tilt, and so on.

According to certain embodiments (not illustrated), an application is provided with motion-based interaction, wherein the media player is embedded using a third party or native API. As an illustrative example, the media player may be provided in a WebView of an application using the WebView class of the Android API provided by Google Inc. and the Open Handset Alliance, or using the UIWebView class of the iOS Developer Library provided by Apple Inc. Alternatively, the media player may be provided by a native library of the device.

In such case, a relationship between the content and the interaction may be defined in content provided to the media player, such as through JavaScript code in a HTML page. In such case, the HTML page may define the media to be played back, as well as interactions or operations or tasks to be performed upon detection of motion-based commands by the device.

An example use case of such motion based control is in video based advertising on a social media system such as Facebook news feed. In such case, a video may be played back in which the user may register their interest in a product, like a page, purchase a product, or navigate to an external page through motion-based commands. The video may include an audio or text-based instruction (e.g. "Shake your phone to like our page"), or such commands and actions may be predefined (e.g. a tilt backwards and forwards may correspond to yes, a tilt sideways may correspond to a no).

In another example, the user may be presented with various images (or other media) in which they are prompted to provide input on, such as to 'like' or 'dislike' the image. For example, the user may tilt left if they don't like the image, or tilt right if they do like the image. Alternatively, the user may shake the device to "pass" on an offer associated with the image. The user is then presented with a next image (or other media) for further input, which may be random, in a list, or customised according to earlier input. Such embodiments are particularly suitable for dating apps or websites, where it is desirable to efficiently select among users.

The motion-based commands may be translated to an action through a URI. For example, upon shaking the phone, a URI may be called in which the user may "like" a page, and upon tilting the phone, a URI may be called where the user may purchase a product.

In certain cases, the URI may be used to make a background HTTP request to a server, to avoid disrupting the media which is being played back. As an illustrative example, a user may be watching a fashion video, where the user is able to register their interest in, purchase, like or vote for a fashion item during the fashion video, and without disrupting the video.

According to certain embodiments, an application is provided in which recording of media is provided with motion-based control of the recording. In such case, the recording functionality may be provided through a web browser, a WebView (discussed above) or a native file library within another application.

According to certain embodiments, in addition to be able to control playback of video based upon motion of a device, the user creating the media is able to select and control other aspects of the device, such as a background soundtrack to be played to the end user, muting audio of a video clip, activating a vibrate function of the device.

According to some embodiments, the system 700 includes a social media component. The social media component enables chat between users, public and private comments relation to content, and a rating system. Furthermore, the social media component enables users to share content, for example by setting a status of the content to public, or store private content.

According to certain embodiments, sharing of content is achieved by moving (e.g. tilting) the device. Navigating to and selecting content to play can also be achieved by moving the device. Furthermore, a shake movement at certain times may cause random media to load and start playing, and thus a movement need not be linked to media in a pre-defined manner. In some systems, all interaction with the system may be provided through motion of a device.

According to certain embodiments, content is provided for limited viewing. In particular, content may be configured to be played a certain number of times, within a specified time period and/or on specific devices only. The content might be configured to report usage information, like play frequency, date, time, device back to the content creator. Deletion of the content could be triggered on certain events or the content creator could decide to remotely delete the content.

According to certain embodiments, an external motion sensor may be used to provide input to, and control a device. For example, a portable device such as a smartphone or tablet may be linked with a further device that includes a display, such as a desktop/laptop computer or a TV or projector, wherein a motion sensor within the portable device may be used to detect movement thereof, to control display of content on the linked further device. In short, motion of the portable device may be used to control media on the further device.

The connection between the portable device and the further devices may be established by any suitable means including by: scanning a QR code displayed on the screen of one device with the camera of the other, and using the code to link the devices; entering a unique code displayed on the screen of one device into the software on the other; navigating to a unique URL on one device that is displayed on the other; being logged into an account (eg. by a username and password) on both devices at the same time; sending an SMS message to the portable device including an URL or other code to link the devices; using the GPS location of the devices to connect devices in proximity to one another; interacting with each device simultaneously, such as by tapping a button on each device at (about) the same time; playing a tone or series of tones on the speakers of one device such that the microphone of the other device can detect the tone to establish the link; or by using an RFID or Bluetooth link between the devices.

In one example of the above embodiment once a suitably persistent connection has been established with a further device, software on the portable device detects a motion-based gesture of a plurality of predefined movement gestures (eg. right tilt, left tilt, etc.), and transmits details of that gesture, along with suitable identification information, such as a unique code, to a server. The server then communicates that information to the further device which may act as a media player. The further device receiving the information then changes the display of media in response the information received. Furthermore, other functions on the further device can be initiated based upon the received gesture, and such functions can be hardware or software related.

The controlling portable device may also display the same interactive media on its screen, or display other information, such as what movement was just recognised, or display buttons to disconnect, pause the media, and provide alternative tappable navigation buttons.

There may be a plurality of further devices configured with a suitably persistent connection with the portable device. Multiple users may control different further devices or peripherals. Furthermore, users may be spatially separated, for example, and multiple users, anywhere in the world, may simultaneously watch or control any other of the further devices.

In particular, one user's portable device could control the media such that one or many other people in any location around the world could experience the same control of media, based on the commands received.

Furthermore, the system described above may be used to control a head mounted display for Virtual Reality purposes. This allows for interactive Virtual Reality experiences for a user in different physical orientations, for example when they are stationary, lying down, sitting in a non-swivel chair and keeping their head still. Voice commands might also be used to control aspects of the Virtual Reality interactive media experiences, as detected by either device.

In the case of multiple users using the system, the control of the media may be passed between users, either manually, or automatically, such as after a period of time.

It is also possible to for multiple people to simultaneously control the experience that multiple people are watching.

Additionally, an audio link could be maintained to allow users to talk with each other during display of the media.

As discussed above, different videos may be associated with each of the available gestures. However, according to further embodiments of the invention, more complex interaction may be used to navigate between a large number of videos. For example, a gesture may be interpreted in the context of a previous gesture. As such, complex branches of interaction may be defined, enabling a truly customised experience to the user.

Figure 8:
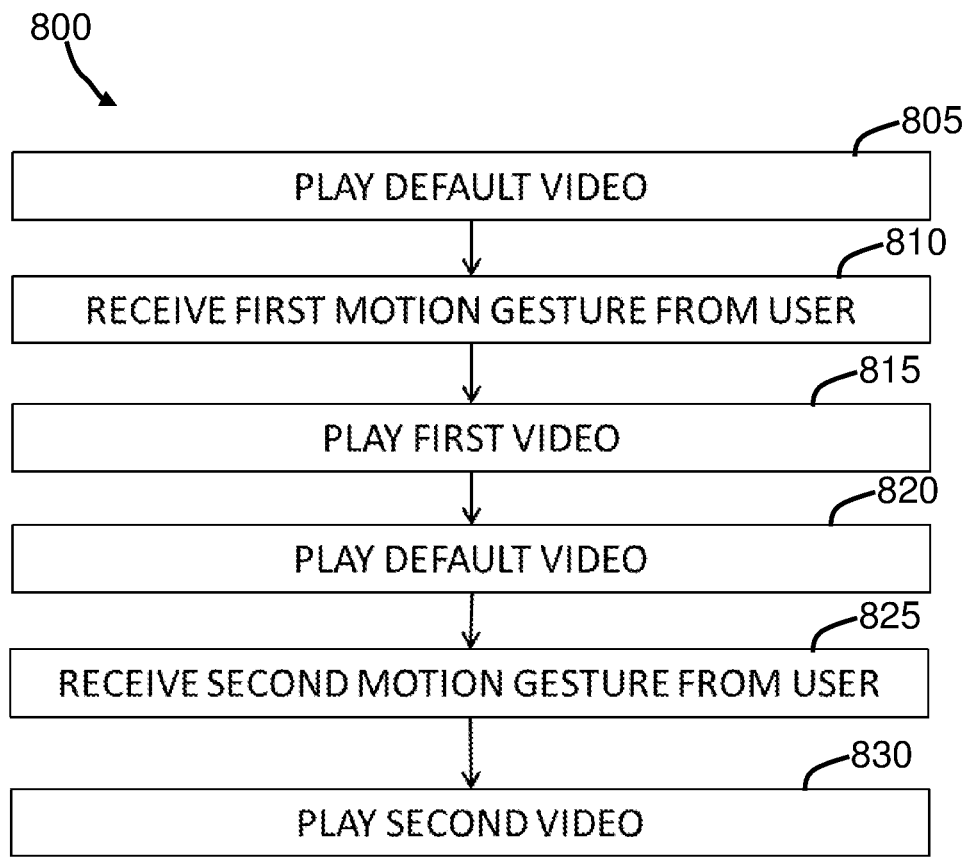
FIG. 8 illustrates an interactive media display method, according to an embodiment of the present invention.

FIG. 8 illustrates an interactive media display method, according to an embodiment of the present invention.

At step 805, a default video is played to the user. The default video may be defined by a media control file, as discussed above, and is generally played automatically and may be looped.

At step 810, a first motion gesture is received from the user. The first motion gesture relates to a motion of a portable device, such as a tilt, a shake or the like.

In response to the first motion gesture, a first video is played. In particular, the first motion gesture is associated with the first video in a media control file, as discussed above.

Upon completion of the first video, the default video is then played again in step 820.

At step 825, a second motion gesture is received from the user. The second motion gesture relates to another motion of a portable device, such as a tilt, a shake or the like.

In response to the second motion gesture, a second video is played. In particular, the second motion gesture is associated with the second video in a media control file, as discussed above.

According to certain embodiments, control of the media is only provided in certain scenarios and not others. For example, user may be forced to watch certain video clips, such as advertisements. In some embodiments, the system is configured to respond to motion during a home (or default) video, while not responding during other videos.

According to certain embodiments, the motion-based media control instructions may be stored in a backwards compatible metadata portion of a video file. As such, a legacy video player may be able to play the media file without any motion based control, whereas a more advanced player may provide detailed motion based interaction with the same file. Alternatively, the motion-based media control instructions may be stored in a HTML file in which the video file is referenced, for example in the form of JavaScript code.

The metadata portion may also include other information about the video file, such as chapter information, which may be used together with the motion-based media control information to provide more intelligent navigation in the video. Examples of such navigation include go to end, pause, slow motion, loop, define "chapters" to jump to, play only funny sections, skip unnecessary parts, speed up certain parts and the like.

Figure 9:
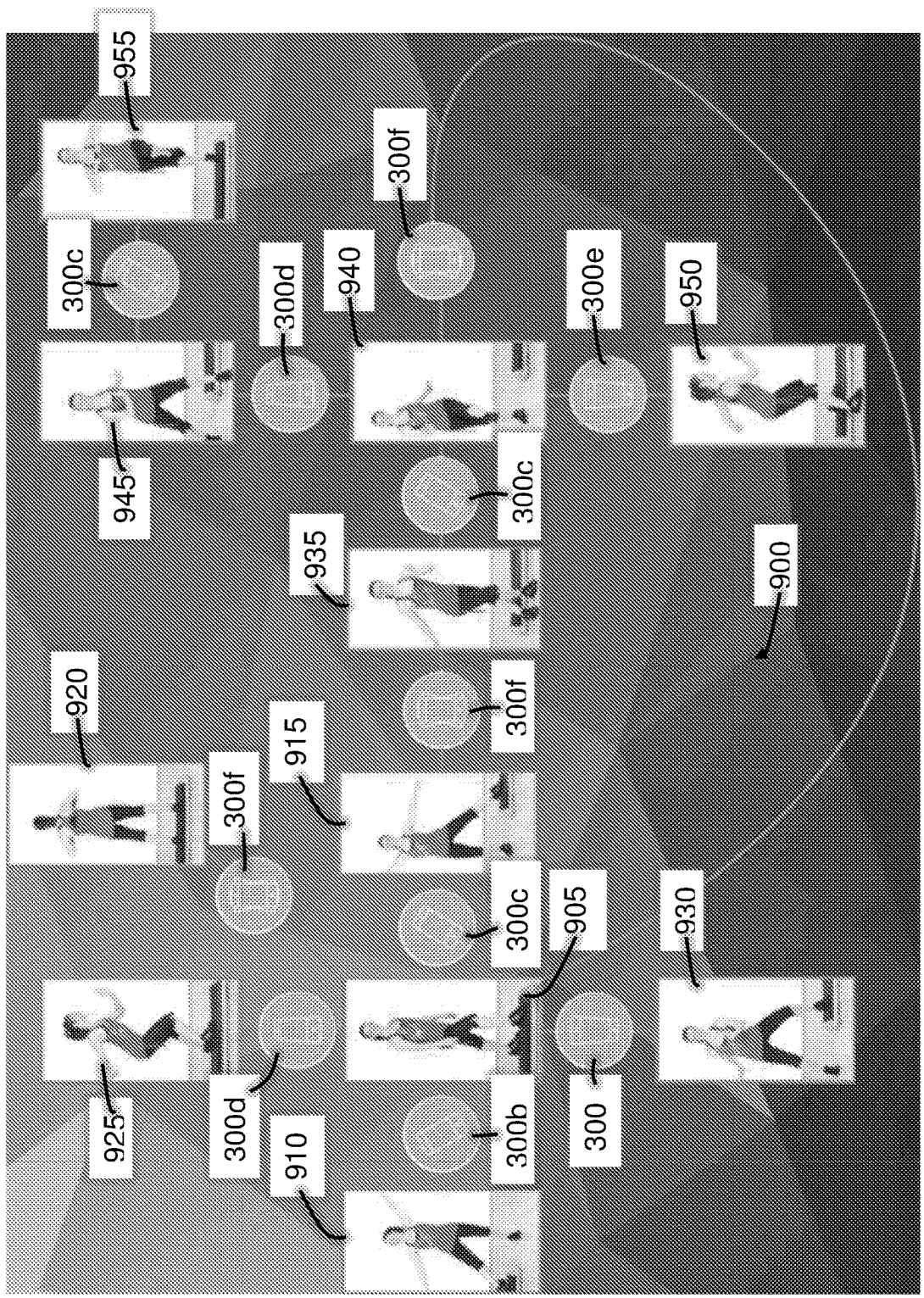
FIG. 9 illustrates a diagram of interaction between a user and a device, and a corresponding display of video files on the device, where each video file corresponds to a state of the system where interactions are interpreted differently, according to an embodiment of the present invention.

FIG. 9 illustrates a diagram 900 of interaction between a user and a device, and a corresponding display of video files on the device, according to an embodiment of the present invention. In particular, each video file corresponds to a state of the system where interactions are interpreted differently.

Initially, a first video 905 is played to the user. Upon detection of a left tilt 300b, a second video 910 is played to the user, after which the first video 905 is again played. Similarly, upon detection of a right tilt 300c, a shake 300f, a forward tilt 300d, or rear tilt 300e, a third video 915, a fourth video 920, fifth video 925 or sixth video 930 is played respectively.

Upon receipt of a shake 300f during playback of the third video 915, a seventh video 935 is played. Similarly, upon receipt of a right tilt 300c during playback of the seventh video 935, an eighth video 940 is played.

During playback of the eighth video 940, several motion-based commands may be interpreted. In particular, upon receipt of a forward tilt 300d or a back tilt 300e, a ninth video 945 or tenth video 950 is played respectively. Additionally, upon receipt of a shake 300f during playback of the eighth video 940, the first video 905 is again played and the process may be repeated.

Finally, upon receipt of a right tilt 300c during playback of the ninth video 945, an eleventh video 955 is played.

Upon completion of playback of any of the second to eleventh videos 910-955 without any motion input, the first video 905 may again be played. Alternatively, and as discussed below, playback may cease upon completion of a particular video and a website may instead be displayed.

As illustrated above, the right tilt 300c is interpreted differently depending on what video is being played. For example, during the first video 905, the right tilt 300c results in playback of the third video 915, whereas during playback of the third video, the right tilt 300c results in playback of the seventh video 935. In short, each motion-based input may be interpreted in light of the video being played, which enables unlimited interaction with the user.

According to some embodiments, a website is automatically opened upon completion of one or more of the videos. For example, upon completion of a video or a set of videos 905-955, a website may be provided that enables purchase of further media. The website may be opened by requesting a URL on the device in which the media is played, the default web browser, or by passing an identifier to another app or website, such as an online auction app or website. The website may open automatically upon the recognition of a motion-based command, after the video clip finishes, or upon reception of another gesture or tap button/s or element/s on the screen. Additionally, a HTTP request may be made to a server including instructions to perform any type of transaction with the server. This may happen without any change of the media, while a video is playing and without any indication to the user.

As a result, the system may facilitate the purchase of anything directly or indirectly related to the content (videos) generally, or to a specific video 905-955. In practice, the process could be used to obtain information from the user, for example to select a product, size, style, colour, etc. then facilitate the purchase or discovery of more information about the product.

The above example describes how embodiments of the present invention could facilitate a purchase of a product or many products without the user touching the screen. Items could be added to a wish list or shopping cart with the checkout and payment process happening at a later time, all using motion-based commands. Items in the shopping cart or wish list could persist across many uses of the application, by saving the associated data to local or remote storage or both.

Further, the payment process may be initiated by a single motion-based command. Payment details may have been collected at an earlier time. This effectively allows for a one-motion purchase, such as a one-tilt purchase, a one-slap purchase, a one-twist purchase, etc.

Additionally the user's size, colour preferences, style preferences, etc. could persist across many uses of the application and influence what items are displayed to the user, according to their saved preferences. As an illustrative example, only clothes that would be likely to fit the user may be shown. The system may additionally only show items that are currently in stock in the user's size. These preferences could be explicitly set by the user however may also be calculated by the system, for example the system could take into consideration user browsing habits, previous purchases, machine learning technologies, or any other method that may allow the system to selectively prioritise displaying certain items instead of other items to the user for whatever reason, possibly for the purpose of increasing sales in relation to the prioritised items.

As a further example, a user may be shown different media based on their user profile. For example, a male user may be shown male clothing or male related items, likewise a female user may be shown female clothing or female related items.

Further to saving the user's preferences as described in the above paragraphs, the system may additionally allow the user to provide one of more images to be displayed together with images or videos of items. This is particularly useful to help the user decide on the suitability of an item. The provided images or parts of the images may appear superimposed over the items (or vice versa) to simulate the item in use, however the images may appear in other places in relation to the item, such as next to the item, under the item, etc.

The system may allow the user to take a photograph using the camera on the device, select an image from local storage, provide an image from a remote source, or any combination of these.

Preferably the image includes a person and software may automatically crop out or select the head of the person. Additionally or instead of this automatically happening, software may provide features allowing for the user to perform a crop or selection operation manually. In practice, when the cropped image of a person's head is displayed with an item such as an item of clothing, it may be superimposed over the item where the head should appear if the person was wearing that item. This is advantageous, as it should allow the user to more easily decide if an item of clothing is suitable for that person. This feature is, however, not limited to items of clothing, and could include any type of item, such as cars, furniture, handbags, wristwatches, etc.

According to certain embodiments (not illustrated), the system may facilitate an auction where many users can bid for items using motion-based input. The movement of the device could trigger bidding and a multi-dimensional navigation menu could support bidding on multiple items almost simultaneously. In other embodiments the system may facilitate gambling related functions through movement of the device, for example selecting race or competitor and expediently placing a bet.

According to certain embodiments (not illustrated), movement of the device can be used to trigger functionality of the device, such as making phone calls and sending SMS; opening apps, calling functions of the app that the player is running within, such as calling Like and Sharing functions in a social media application; calling functions of other apps and passing data to other apps, such as a URI.

It should be noted that it is advantageous to the user to be able to view media in full-screen mode and still be able to interact with the media (or the device generally). As such, there is no need to waste part of the screen on graphical elements, such as buttons, or waiting for a video to end to be able to interact with the device. Furthermore, it may be more convenient to interact with the device using motion-based commands, rather than, for example, tap the screen or click a button to initiate an action. For instance, tapping the screen will cause the user's finger to cover part of the screen momentarily, blocking the screen from the user's view.

According to certain embodiments, one or more of the videos 905-955 may be buffered or preloaded either from local files, remote files or streaming servers during playback of another video 905-955. This may be performed in anticipation of commands of the user.

In some embodiments, the device may buffer a first portion (e.g. 10 seconds) of all video files to which the user may directly navigate from the current video file. In the case of the diagram 900, during playback of the first video 905, the device may buffer a first portion of each of the second, third, fourth, fifth and sixth videos 910-930. In other embodiments, the video files to which the user may directly navigate from the current video file may be downloaded in their entirety, rather than just a first portion thereof.

As a result of the buffering (or file download), the device is able to directly play the requested content upon recognition of the gesture, which reduces lag and improves user experience.

In a further embodiment of the invention, an interactive application (e.g. a shopping application) is controlled according to motion-based gestures, while video (such as an advertisement) is being displayed on the user device, as outlined below.

Figure 10B:
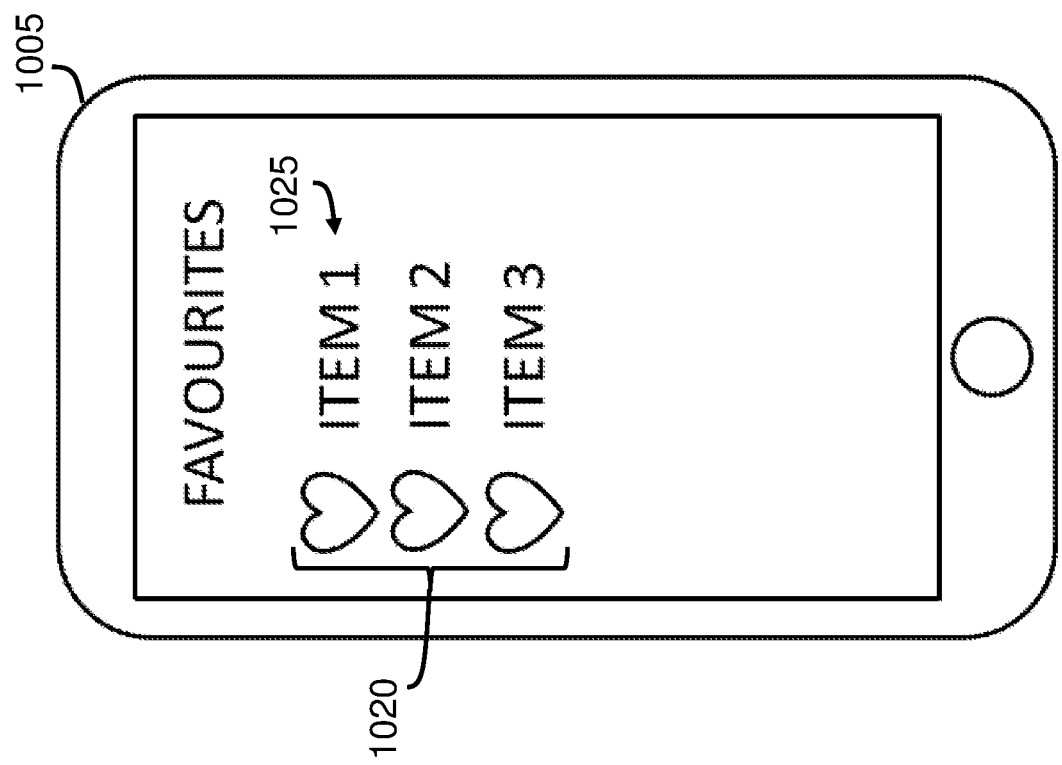
FIG. 10b illustrates the user device of FIG. 10a, on which a favourites list is presented.
Figure 10A:
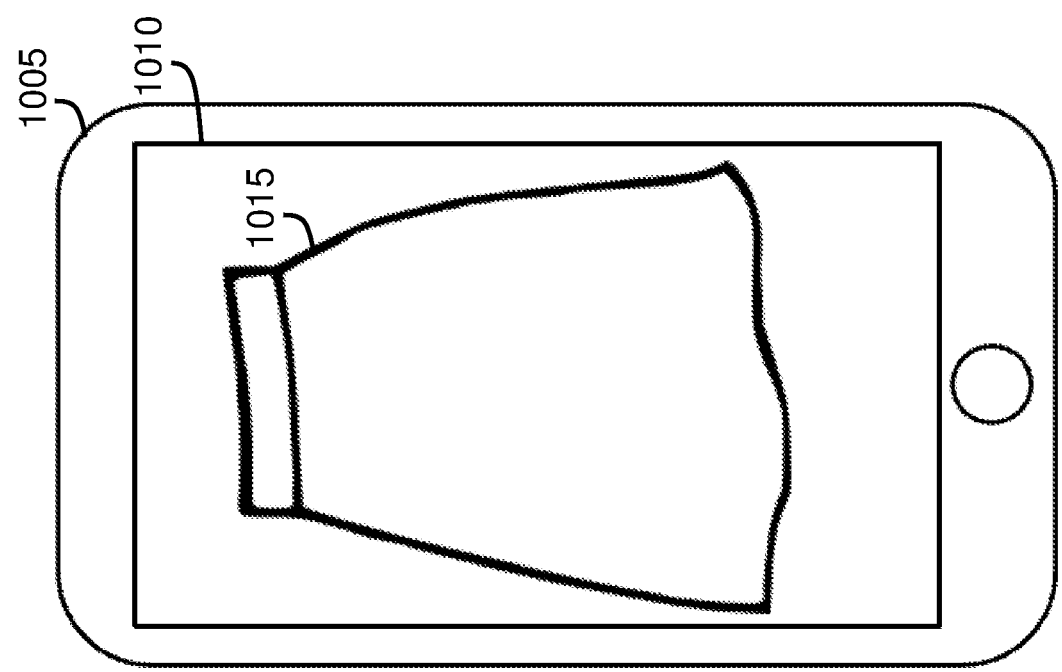
FIG. 10a illustrates a user device on which video is displayed and in which the user may interact through motion based gestures, according to an embodiment of the present invention.

FIG. 10a illustrates a portable user device 1005 in a playback configuration according to an embodiment of the present invention. In particular a video 1010 is displayed, in full screen, on the portable user device 1005, while a controller (not illustrated) is configured to place certain items in a favourites list according to motion-based gestures.

In particular, the video 1010 is associated with media control instructions, which define actions according to time points in the video 1010. As such, different items may be placed in the favourites list according to when the user interacts with the video 1010.

In the present example, tilting the device 1005 left or right is associated with moving the video to back and forward between time points, and tilting the device forward is associated with adding an item to a favourites list, dependent on the current time of the video (e.g. between two time points). However, the creator of the content may create any suitable association between gestures and actions, and such association may change as the video is played back.

The video 1010 may display items 1015, such as clothing, gadgets or the like, which are available for purchase. In such case, several different items 1015 are typically displayed throughout the video, and often in a context. For example, in the case of clothing, the clothing may be illustrated in use (i.e. worn), and similarly in the case of gadgets, the gadgets may be illustrated being used.

According to certain embodiments, training instructions are rendered into the video 1010 at the beginning of the video. In particular, the training instructions illustrate what action (e.g. fast forward, add to favourites) each gesture (e.g. tilt left, tilt forward) is associated with. This is particularly important when the video 1010 is displayed full screen, as no room is left on the display of the user device 1005 for such instructions.

When the video is finished, the user sees a list of items they selected using the tilting gestures, as shown in FIG. 10b. In particular, the portable user device 1005 displays a favourites list 1020, comprising a plurality of shopping elements 1025. The user can then go on to purchase an item, or find out more about the item, by tapping on the corresponding shopping element 1025.

This embodiment thus illustrates one example of user interaction with a portable device while a full screen video (or other media) continues to play or be displayed. Furthermore, that full screen video may be played from within another application, for example a social media application such as Facebook.

As can be seen from the favourites list 1020, multiple items can be added to the list depending on when the user interacted with the device 1005. This is particularly useful when multiple items are displayed in the video, each of which is available for purchase.

The skilled addressee will readily appreciate that any suitable action may take place upon receipt of a motion-based gesture. For example, items may be added to a shopping cart, and/or actual purchases could occur while video is playing.

Figure 11:
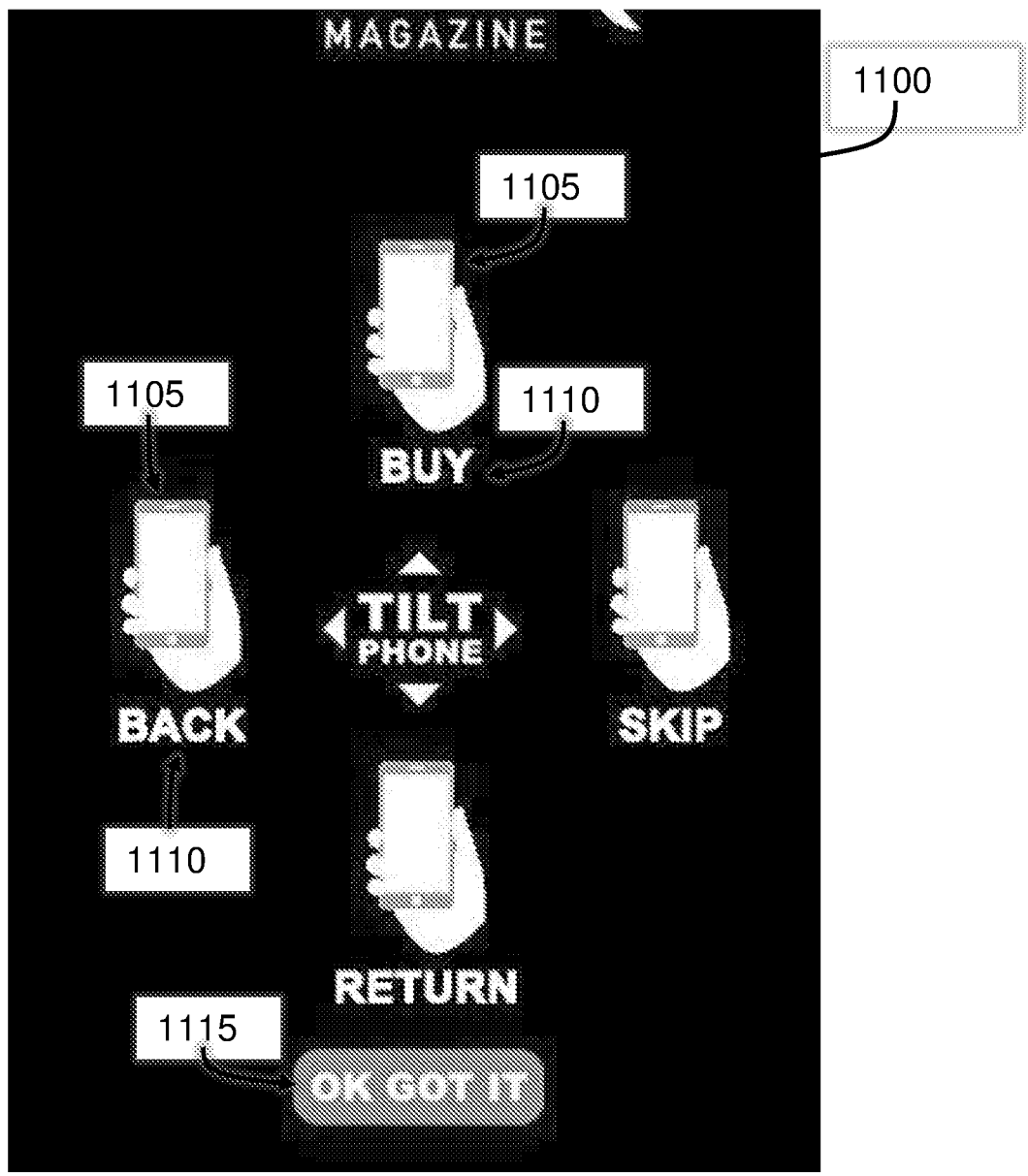
FIG. 11 illustrates a screenshot of a training screen, where the user is trained to understand the tilt controls of the system, according to an embodiment of the present invention.

As discussed above, it is often advantageous to provide training to the user prior to playing media. FIG. 11 illustrates a screenshot of a training screen, according to an embodiment of the present invention.

The training screen includes a plurality of gesture elements 1105, and a plurality of action elements 1110, wherein each action element 1110 is associated with a gesture element. In the example illustrated in FIG. 11, a tilt to the left moves back in the video and a forward tilt results in a purchase (buy) of the currently presented item.

The gesture elements 1105 are advantageously animations, illustrating a motion-based gesture with reference to the user device. For example, the gesture element 1105 relating to the right tilt may be configured to illustrate an animation of a right tilt.

Furthermore, the training screen may be configured to detect gestures, and highlight an associated gesture element 1105 upon receipt of the gesture. For example, the gesture element 1105 relating to the right tilt may be highlighted upon receipt of a right tilt gesture, to confirm with the user which gesture is received. This is particularly useful as the user practices motion based gestures.

After viewing the training screen, the user is able to tap a start video button 1115 to start the video.

The media control instructions may define a multi-dimensional navigation hierarchy. For example, the user may navigate back and forward inside a video, as well as in and out of the video, for example to websites or other videos. As an illustrative example, certain gestures may be used to navigate back and forward in a video, whereas another gesture may cause a web page to be displayed. In addition, different web pages may be displayed based according to where the user is on a timeline of the video.

Figure 12B:
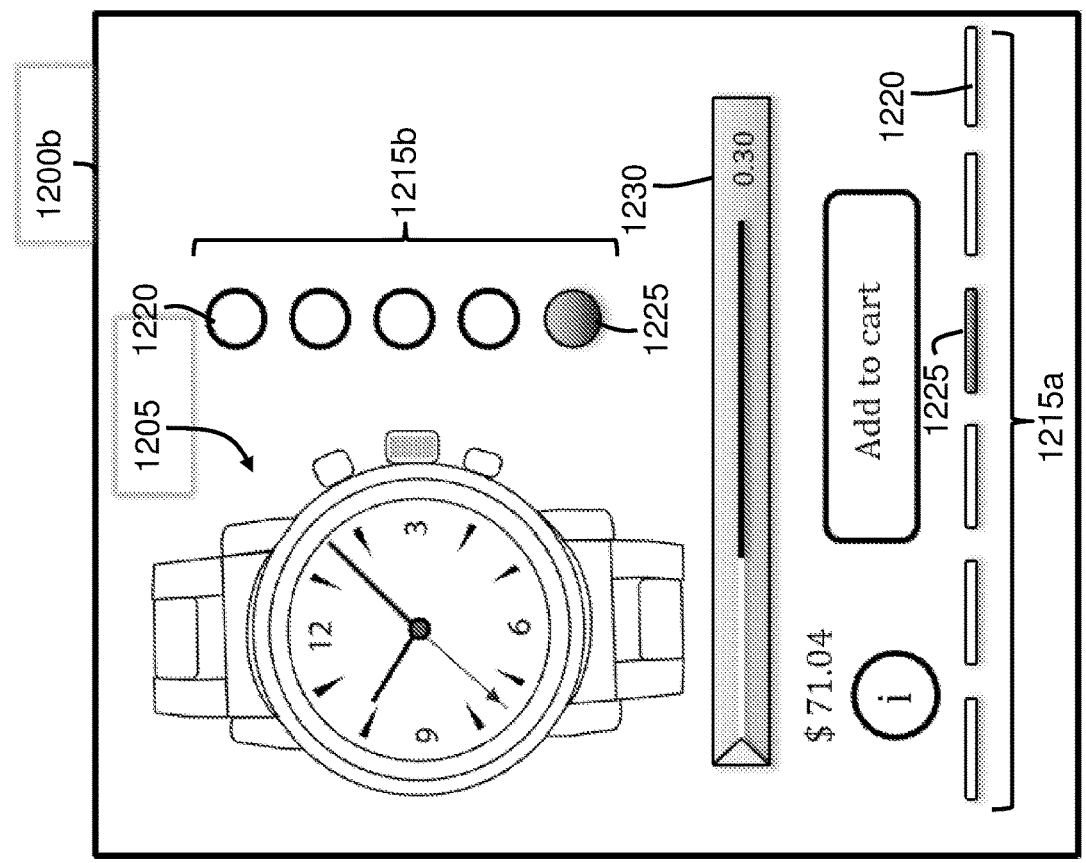
FIG. 12b illustrates a further screenshot of the interactive shopping screen of FIG. 12a, where the user has navigated in the multi-dimensional navigation hierarchy.
Figure 12A:
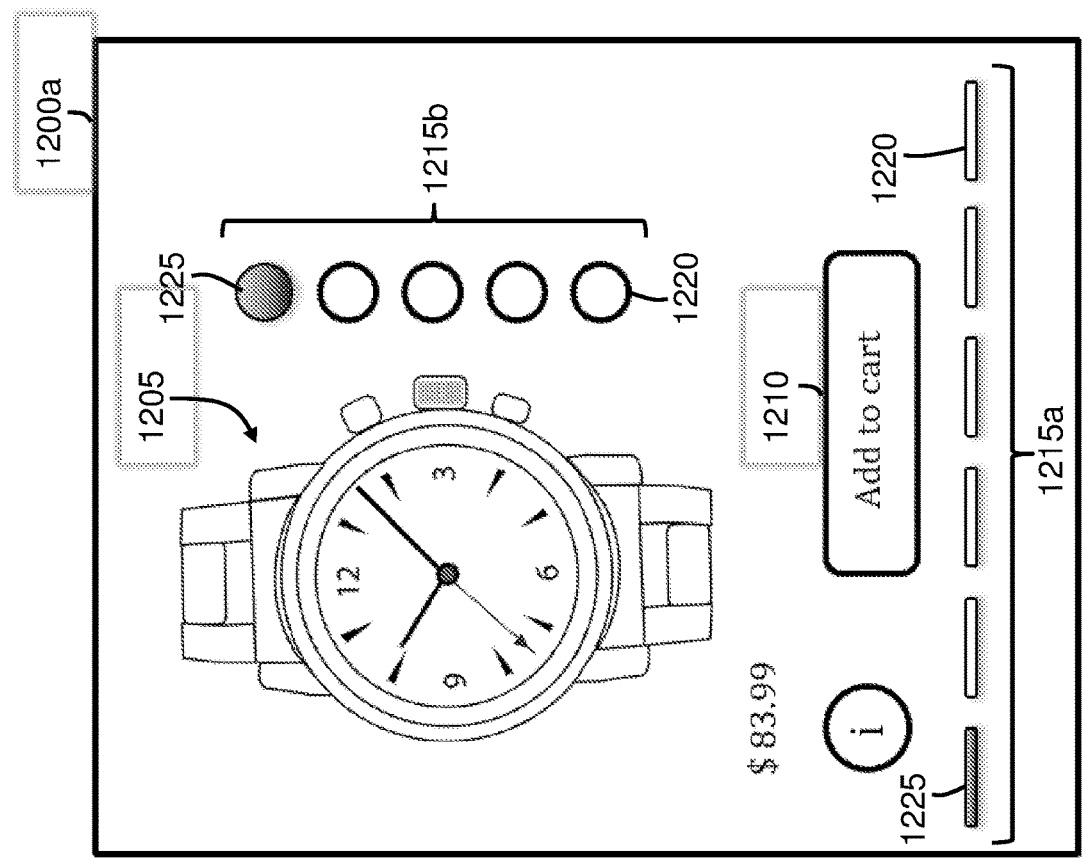
FIG. 12a illustrates a screenshot of an interactive shopping screen including multi-dimensional navigation, according to an embodiment of the present invention.

FIG. 12*a* illustrates a screenshot 1200*a* of an interactive shopping screen, according to an embodiment of the present invention. The interactive shopping screen provides a 4-way navigation hierarchy, as discussed above As shown in FIG. 12*a*, the interactive shopping screen comprises an image 1205 of an item, and an associated "add to cart" button 1210. Furthermore, first and second navigation elements 1215*a*, 1215*b* are displayed to provide an indication to the user of where they are in the multi-dimensional navigation hierarchy.

In particular, the first and second navigation elements 1215*a*, 1215*b* each define possible positions 1220 and an actual position 1225 in a respective dimension. FIG. 12*a* illustrates the leftmost position in a left/right direction as the actual position (see the first navigation element 1215*a*) and the rearmost position front/rear direction as the actual position (see the second navigation element 1215*b*).

As the user navigates in the 4-way navigation hierarchy, the image 1205 may be updated to illustrate alterative configurations of the same item, or to display alternative items.

FIG. 12*b* illustrates a further screenshot of the interactive shopping screen, where the user has navigated forward four steps and right three steps in the 4-way navigation hierarchy. The further screenshot includes a playback bar 1230, which enables the user to control playback of a video. In particular, the image 1205 may be replaced by a video of the item.

When the user wishes to purchase one of the items, he or she may do so using the "Add to cart" button 1210. Alternatively or additionally, the user may purchase items using motion based gestures, as discussed above.

In some embodiments, the system may be configured to automatically, or semi-automatically generate gesture-based control data, according to one or more websites. In such case, the user may enter a URL or multiple URLs of websites, from which the system extracts information such as media, product description, prices, etc. This is particularly useful in converting traditional web-base stores into motion gesture-based interactive shopping systems.

In the example of FIGS. 12*a* and 12*b*, the first navigation element 1215*a* may be associated with content from different URLs, and the second navigation element 1215*b* may relate to different content from a single URL.

The generated media control instructions may reference the media directly from the source (i.e. the original URLs), or the media may be copied to another server (such as a content delivery network) for serving the media. The interactive advert may direct the user to the entered URL when a purchase is desired, or purchasing may happen directly as described earlier.

In yet alternative embodiments, one or more product feeds may be used instead of URLs to generate the gesture-based control data. In such case, as data is received on the product feed, the information, such as media (or location of media), product description, prices, may be automatically extracted therefrom and used in a similar manner to that described above to generate the control data.

The system may be configured to continuously update the control data, or generate the control data once off (e.g. in response to receiving an instruction from the user). For example, in some embodiments the products displayed may change according to the information in the product feed at that time.

According to certain embodiments, the system may be further configured to receive preferences from the user, such as styles of GUI elements, colours, number of products to display, and generate the control data based thereon. In this context, the user may be setting these preferences for themselves or for other users who will later use the system.

According to some embodiments, the display device can be held in either a portrait or landscape orientation by the user. In such case, the media is played back in either portrait or landscape mode, such that it is oriented correctly during playback, and motion-based input is detected according to the orientation the device is being held.

According to certain embodiments, the player may collect statistics and usage information. The player may then send this information to a server for analysis. Such data may allow for understanding a user's interests, creating a user profile, targeting and retargeting of advertisements, changing the nature of the content based on the users' profile, etc.

The above mentioned data collection process could additionally allow for a self-learning piece of technology, which could identify trends and other learnings to apply back into the system.

According to certain embodiments, the present invention may include Digital Rights Management (DRM). The DRM may be applied to each of the videos 905-955, and to any media control file(s), either as a group or individually, to prevent the content from being re-distributed in an unauthorised manner.

According to some embodiments, the motion-based interaction with the system is context aware. In particular, one or more of the motion-based interactions 300*b*-300*e* may be interpreted differently depending on the context, or different videos may be played depending on the context.

Examples of contexts in which the system may adapt include time of day, weather, time of year, season, current location, and relative location. As an illustrative example, if viewing at night, different clips may play compared with viewing during the day; and if viewing when the season is winter, a different clip might play compared with viewing during summer.

The above examples focus primarily on the use of an accelerometer and/or gyroscope to determine motion-based inputs. However, alternatively or additionally, the motion-based inputs may be determined according to a compass, a camera, a position sensor (such as a GPS) or any other input that can be used to determine an attitude, rotation rate, acceleration or other aspect of a device. In a different embodiment, motion based commands are generated by observing changes in user positions as identified by a camera integral to the user device or attached to it.

In some cases, the device is coupled to the user as a head mounted display. In such case, commands may be generated by the user tilting their head left or right, or forwards or backwards, for example, to selectively control display of the media.

Most portable devices have a camera which can be used to track head movements of the user and trigger an associated action based on that movement, for example left head tilt triggers the left gesture action, a right head tilt triggers the right gesture action, etc. This is, however, not limited to head movements. Hand movements, body movement and movement of objects as seen by the camera could also be used. This would be very useful if someone had limited use of his or her hands. In the present invention the movement of the user replaces the movement of the device.

According to certain embodiments, the motion-based inputs are determined across three axes. The motion based input may relate to movement along the axes, rotation around the axes, or a combination thereof.

Embodiments of the present invention may be used in a variety of different scenarios, including for entertainment (e.g. funny interactive videos, interactive adventures), training (e.g. tutorials where a user is able to easily replay sections of the video as required), education (e.g. where a user is able to answer a video question and thus navigate to the next question by making the correct gesture), virtual tours, games, online shopping, dating websites, or when single handed operation of the device is desirable.

In the case of a single video, motion may be used to initiate fast forward, slow forward, jump forward, fast rewind, slow rewind, jump back, pause and similar functions, in a similar manner to a joystick or other user input device. This may be particularly useful when viewing security camera footage on a mobile device.

A further example of the present invention relates to Virtual Reality. When the device is mounted to a user's head by a suitable mounting device, the control of the media and calling of functions can be made via head movements. In this example, the system may display the media in a suitable way for Virtual Reality experiences, such as in split-screen view. In such case, a first type of movement, such as a panning movement of the device, may be used to influence the media by a virtual reality module (e.g. provide Virtual Reality by tracking movement of the user's head), and a second type of movement, such as an abrupt nodding movement, may be used to change content of the media (e.g. change scenes) or otherwise influence the media.

The system may then allow for both recording and playing of such Virtual Reality experiences. The manipulation of the media so that it is more suitable to Virtual Reality experiences may happen while recording the media, after recording the media and before playing, whilst the media is playing, or any combination of these. The manipulation may take place on the device, on a further device or on a remote server and any combination of these.

While the media control instructions have been primarily described with reference to a relationship between a motion-based gesture and media to be displayed, the media control instructions may also control the display of media in the absence of motion-based gestures.

For example, the media control instructions may cause a section of video (e.g. between 2 markers) to loop infinitely (or a certain number of times), to pause the media and wait for additional user input, to pause the media when a first gesture is detected and continue when another gesture is detected, or the like.

While the above interaction has been described with reference to motion-based interaction, where motion alone is used to identify the gesture, in some embodiments, the user may touch the screen while moving the device to provide a gesture.

In some cases, gestures may be interpreted differently, or be associated with a different function, depending on whether the user is touching the screen or not while moving the device. Alternatively, gestures may only be received (detected) while the user is touching the screen to prevent inadvertent detection of gestures based upon accidental movement of the device.

In some embodiments, the user may touch anywhere on the screen while moving the device. Alternatively, a graphical element, such as a button, may be used, either to activate gesture recognition, or to modify gesture recognition.

According to certain embodiments, the system may be configured to turn on and off gesture recognition using a particular gesture. For example, the user may turn on gesture recognition by shaking the device, and later turn off gesture recognition by again shaking the device. This is particularly advantageous in reducing accidental gesture control of media.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An interactive computing system comprising:
a user device including a motion sensor, for receiving motion-based gestures through motion of the user device;
a media player configured to play media, the media being associated with one or more selectable items by media control instructions and according to time points in the media; and
a controller, coupled to the motion sensor, the controller configured to:
control an interactive application of the user device according to the motion-based gestures, while the media player plays the media; and
cause the interactive application to add at least one of the one or more selectable items to a list in response to the motion sensor receiving a motion-based gesture through motion of the user device while the media player plays the media and according to the association of the media with the one or more selectable items defined in the media control instructions and according to a time in the playback of the media.

2. The interactive computing system of claim 1, wherein the motion-based gestures comprise a plurality of predefined gestures.

3. The interactive computing system of claim 1, wherein the motion-based gestures are defined by local motion of the user device.

4. The interactive computing system of claim 1, wherein the motion-based gestures comprise one or a combination of: a left tilt, a right tilt, a forward tilt, a rear tilt, an inversion tilt, a circular tilt, a flip tilt, a twist, and a shake of the user device.

5. The interactive computing system of claim 1, further including an accelerometer, wherein the motion-based gestures are determined at least in part according to data from the accelerometer.

6. The interactive computing system of claim 1, further including a gyroscope, a compass or a positioning system, wherein the motion-based gestures are determined at least in part according to data from the gyroscope, the compass or the positioning system.

7. The interactive computing system of claim 1, wherein the controller is configured to cause the interactive application to purchase an item, add an item to a digital shopping cart or wish list, place a bid on an item, complete a transaction, make a phone call, send an SMS, open another application, communicate with a further device, or call a function of another application.

8. The interactive computing system of claim 1, wherein the controller forms part of the user device.

9. The interactive computing system of claim 1, wherein the system consists of a handheld device.

10. The interactive computing system of claim 1, wherein the controller is configured to control the interactive application of the user device while the media player is playing media in full screen on the user device.

11. The interactive computing system of claim 1, wherein the media comprises video.

12. The interactive computing system of claim 1, wherein the motion-based gestures include media control gestures and application control gestures, wherein the controller is configured to control playback of the playing media according to the media control gestures, and control the interactive application based upon the application control gestures.

13. The interactive computing system of claim 1, wherein the controller is configured to selectively control the interactive application by receiving a first motion-based gesture and determining a first interactive application configuration in response thereto, and subsequently receiving a second motion-based gesture and determining a second interactive application configuration in response thereto.

14. The interactive computing system of claim 1, wherein the control of the interactive application is dynamically defined.

15. The interactive computing system of claim 14, wherein the control of the interactive application is dynamically defined according to when the motion-based gesture was received, or a state of the system at the time the gesture was received.

16. The interactive computing system of claim 1, wherein the control of the interactive application comprises a multi-dimensional navigation hierarchy defined using the motion-based gestures.

17. An interactive method comprising:
receiving motion-based gestures through movement of a user device;
playing media, the media being associated with one or more selectable items by media control instructions and according to time points in the media;
controlling an interactive application of the user device based upon the motion-based gestures, while playing the media; and
adding at least one of the one or more selectable items to a list in response to the motion sensor receiving a motion-based gesture through motion of the user device while the media player plays the media and according to the association of the media with the one or more selectable items defined in the media control instructions and according to a time in the playback of the media.

18. An interactive computing system comprising:
a user device including a motion sensor, for receiving motion-based gestures through motion of the user device;
a media player configured to play media, the media being segmented into a plurality of segments, wherein media control instructions are associated with each of the segments; and
a controller, coupled to the motion sensor, the controller configured to control an interactive application of the user device while the media player plays the media, wherein the control of the interactive application is dependent upon a received motion-based gesture and media control instructions associated with a segment of the media being played at the time of receiving the motion based gesture.

* * * * *